US010951723B2

(12) United States Patent
Justin et al.

(10) Patent No.: US 10,951,723 B2
(45) Date of Patent: *Mar. 16, 2021

(54) THEME-BASED PUSH NOTIFICATIONS

(71) Applicant: INTERNATIONAL BUSINESS MACHINES CORPORATION, Armonk, NY (US)

(72) Inventors: Josephine E. Justin, Bangalore (IN); Srinivasan Nanduri, Satrampadu Bridge Eluru (IN)

(73) Assignee: International Business Machines Corporation, Armonk, NY (US)

(*) Notice: Subject to any disclaimer, the term of this patent is extended or adjusted under 35 U.S.C. 154(b) by 422 days.

This patent is subject to a terminal disclaimer.

(21) Appl. No.: 15/723,353

(22) Filed: Oct. 3, 2017

(65) Prior Publication Data
US 2019/0104190 A1 Apr. 4, 2019

(51) Int. Cl.
| | |
|---|---|
| H04L 29/08 | (2006.01) |
| H04W 88/02 | (2009.01) |
| G06F 3/0481 | (2013.01) |
| G06F 15/16 | (2006.01) |
| H04W 48/16 | (2009.01) |
| G06Q 50/00 | (2012.01) |

(52) U.S. Cl.
CPC .......... H04L 67/26 (2013.01); *G06F 3/0481* (2013.01); *G06F 15/16* (2013.01); *G06Q 50/01* (2013.01); *H04W 48/16* (2013.01); *H04W 88/02* (2013.01)

(58) Field of Classification Search
CPC ...... H04L 67/26; H04W 88/02; H04W 48/16; G06F 3/0481; G06F 15/16; G06Q 50/01
See application file for complete search history.

(56) References Cited

U.S. PATENT DOCUMENTS

| | | |
|---|---|---|
| 9,282,192 B2 | 3/2016 | Laasik et al. |
| 2007/0014305 A1 | 1/2007 | Assad |
| 2012/0117176 A1* | 5/2012 | Luo ......................... H04W 4/14 709/206 |

(Continued)

OTHER PUBLICATIONS

Bingo Times, http://www.bingotimes.com.tw/English/Picture/All/2Product_photo/3Game/03_Slot/slot-jackpot-icon.png, Printed on Jul. 3, 2017, pp. 1-1.

(Continued)

Primary Examiner — Joshua D Taylor
(74) Attorney, Agent, or Firm — Jordan T. Schiller

(57) ABSTRACT

A method displaying a theme-based push notification on a mobile device. The method includes registering a mobile device, wherein registering includes receiving, by an application backend server, a registration token from the mobile device, and storing the received registration token. The method further includes participating in dissemination of at least one theme-based push notification template, wherein participating in dissemination includes transmitting, by the application backend server, at least one theme-based push notification template to the registered mobile device. The method further includes processing a push notification together with the at least one theme-based push notification template, wherein the processing includes generating payload information, by the application backend server, and transmitting the payload information with the push notification to the registered mobile device.

12 Claims, 6 Drawing Sheets

(56) References Cited

U.S. PATENT DOCUMENTS

| | | | |
|---|---|---|---|
| 2012/0179764 A1* | 7/2012 | Erdal | G06Q 50/01 |
| | | | 709/206 |
| 2013/0007143 A1 | 1/2013 | Rinard et al. | |
| 2013/0111003 A1 | 5/2013 | Burckart | |
| 2014/0257985 A1 | 9/2014 | Gibson et al. | |
| 2015/0019662 A1 | 1/2015 | O'Kane et al. | |
| 2015/0245281 A1* | 8/2015 | Beguin | H04W 48/16 |
| | | | 370/255 |
| 2015/0262430 A1* | 9/2015 | Farrelly | H04L 67/306 |
| | | | 705/13 |
| 2015/0350147 A1 | 12/2015 | Shepherd et al. | |
| 2017/0004126 A1 | 1/2017 | Li et al. | |
| 2017/0344226 A1* | 11/2017 | Gudla | G06Q 20/322 |
| 2018/0308569 A1* | 10/2018 | Luellen | G16H 20/10 |

OTHER PUBLICATIONS

Mell et al., "The NIST Definition of Cloud Computing," Recommendations of the National Institute of Standards and Technology, U.S. Department of Commerce, Special Publication 800-145, pp. 1-7.

IBM, List of IBM Patents or Patent Applications Treated as Related, Appendix P, dated Jul. 3, 2019, 2 pages.

Pending U.S. Appl. No. 16/458,625, filed Jul. 1, 2019, entitled: "Design Theme-Based Push Notifications".

* cited by examiner

THEME-BASED PUSH NOTIFICATIONS

BACKGROUND

Embodiments of the invention generally relate to the field of computing and more particularly to data processing and push notifications.

There are two types of restrictions on push notifications: (1) the number of characters allowed in the notification (e.g. typically ~4 k bytes of characters), inclusive of everything that is sent as part of the payload (i.e. message identifier, URL, notification text, description, etc.); and (2) a push notification service provider cannot determine themes/profiles for how the push notifications should be displayed on the receiving computing device.

In the current state, there is no way for the push notification service providers to instruct the application, running on a user device, to display the notification in a particular fashion/style. Both the restrictions are inter-linked, as sending themes/profiles for push notifications to the user device may exceed the permissible push notification size.

SUMMARY

Embodiments of the invention include a method, computer program product, and system, for displaying theme-based push notifications on a computing device.

According to an embodiment of the invention, a method for displaying a theme-based push notification on a mobile device includes registering a mobile device, wherein registering includes receiving, by an application backend server, a registration token from the mobile device, and storing the received registration token. The method further includes participating in dissemination of at least one theme-based push notification template, wherein participating in dissemination includes transmitting, by the application backend server, at least one theme-based push notification template to the registered mobile device. The method further includes processing a push notification together with the at least one theme-based push notification template, wherein the processing includes generating payload information, by the application backend server, and transmitting the payload information with the push notification to the registered mobile device.

A computer program product, according to an embodiment of the invention, for displaying a theme-based push notification on a mobile device. The storage device embodies program code that is executable by a processor of a computer to perform a method. The method includes registering a mobile device, wherein registering includes receiving, by an application backend server, a registration token from the mobile device, and storing the received registration token. The method further includes participating in dissemination of at least one theme-based push notification template, wherein participating in dissemination includes transmitting, by the application backend server, at least one theme-based push notification template to the registered mobile device. The further includes processing a push notification together with the at least one theme-based push notification template, wherein the processing includes generating payload information, by the application backend server, and transmitting the payload information with the push notification to the registered mobile device.

According to another embodiment, a system for displaying a theme-based push notification on a mobile device, includes one or more computing devices each having one or more processors and one or more tangible storage devices. The one or more storage devices embody a program. The program has a set of program instructions for execution by the one or more processors. The program instructions include instructions for registering a mobile device, wherein registering includes receiving, by an application backend server, a registration token from the mobile device, and storing the received registration token. The program instructions further include instructions for participating in dissemination of at least one theme-based push notification template, wherein participating in dissemination includes transmitting, by the application backend server, at least one theme-based push notification template to the registered mobile device. The program instructions further include instructions for processing a push notification together with the at least one theme-based push notification template, wherein the processing includes generating payload information, by the application backend server, and transmitting the payload information with the push notification to the registered mobile device.

DETAILED DESCRIPTION

Figure 1:
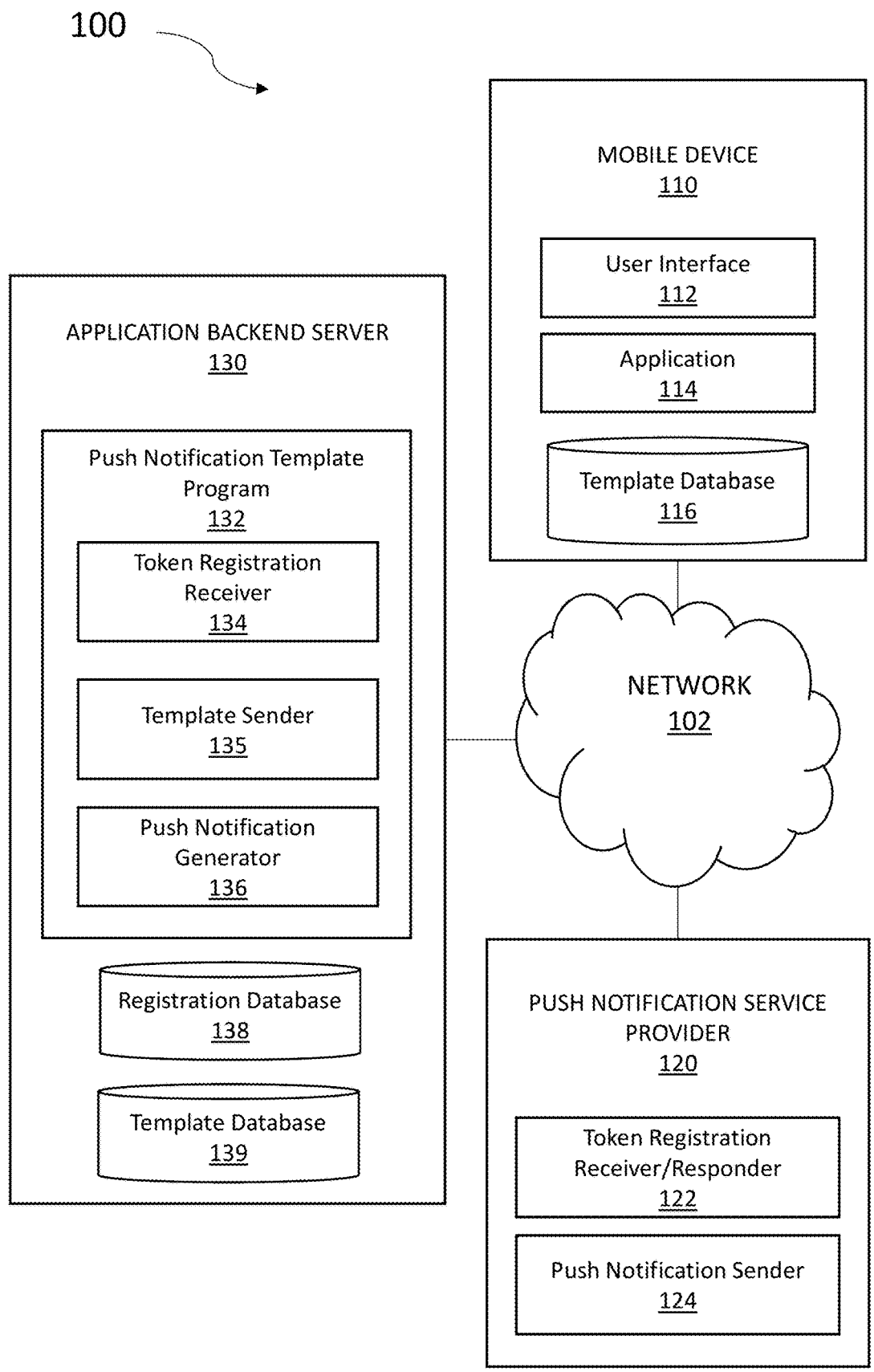
FIG. 1 illustrates push notification computing environment 100, in accordance with an embodiment of the present invention.

Push notifications are a robust and efficient way to propagate short, timely, and relevant information. Push notification service providers (e.g. Apple Push Notification Service (APNS is a registered trademark of Apple, Inc.®), Google Cloud Messaging (GCM is a registered trademark of Google, Inc.®), Firebase Cloud Messaging (FCM is a registered trademark of Google, Inc.®)) initiate and provide the push notifications to computing devices. These push notification service providers determine when a push notification is to be sent and which devices should receive them.

Currently, there are templates provided by various push notification service providers (i.e. APNS, GCM, FCM), however those templates customize the way the notifications are displayed. Such templates do not help in parameterizing the push notification display on the user device by picking up particular templates defined based on the themes that the push notification service provider server supports.

The proposed solution considers a method and system for push notification service providers to propagate the themes/profiles for push notifications to the applications on a user device for use as parameters in push notification display. The present invention discloses defining templates based on various themes that a push notification service provider, or messaging service, supports. These pre-defined templates assist in making robust push notifications and also help in overcoming the push notification size limit.

The pre-defined templates are sent to the user device from the application backend server on a request-response call. Furthermore, the pre-defined templates are used to populate parameterized values contained within the push notification and to display the theme-based push-notifications.

In some embodiments, the present invention provides full control to the application backend server regarding how the push notification will be displayed on the user device, based on the themes that the application backend server supports.

Application backend servers, in an exemplary embodiment, may define the templates to be used for the push notifications. For example, there may be various templates stored on the application backend server, such as "Weather Notification" template, "Offers Notification" template, "Movie Updates Notification" template, etc. These templates define the kind of style that various push-notifications may use based on the mobile device/push notification service used.

For example, the templates may define which parameter of the push notification has to be displayed as an icon, which parameter has to be displayed as big text content, and which parameter has to be displayed as the header, etc. In this fashion, the parameterized, or pre-defined, templates assist the application backend server in determining the way the push notifications are displayed on the user device, and how the push notifications should behave in case of an interactive push notification. Additionally, this enables the application software developer to concern herself with the functionality of the push notification rather than focusing on the styled display of the push notification.

Presently, there is no way for the push notification service provider to instruct the styled display of push notifications. The present invention allows the application backend server to decide the push notification display style. Additionally, the present invention enables the application backend servers to send additional characters in the payload, since the templates are externalized from the actual content of the push notification.

Hereinafter, exemplary embodiments of the present invention will be described in detail with reference to the attached figures.

The present invention is not limited to the exemplary embodiments below, but may be implemented with various modifications within the scope of the present invention. In addition, the drawings used herein are for purposes of illustration, and may not show actual dimensions.

FIG. 1 illustrates a computing environment 100, in accordance with an embodiment of the present invention. Computing environment 100 includes mobile device 110, push notification service provider 120, and application backend server 130 all connected via network 102. The setup in FIG. 1 represents an example embodiment configuration for the present invention, and is not limited to the depicted setup in order to derive benefit from the present invention.

In the example embodiment, mobile device 110 contains user interface 112, application 114, and template database 116. In various embodiments, mobile device 110 may be a laptop computer, tablet computer, netbook computer, personal computer (PC), a desktop computer, a personal digital assistant (PDA), a smart phone, or any programmable electronic device capable of communicating with push notification service provider 120 and mobile server 130 via network 102. Mobile device 110 may include internal and external hardware components, as depicted and described in further detail below with reference to FIG. 4. In other embodiments, mobile device 110 may be implemented in a cloud computing environment, as described in relation to FIGS. 5 and 6 herein. Mobile device 110 may also have wireless connectivity capabilities allowing for communication with push notification service provider 120, application backend server 130, and other computers, devices, or servers over network 102.

In the example embodiment, mobile device 110 includes user interface 112, which is a computer program that allows a user to interact with mobile device 110 and other connected devices via network 102. For example, user interface 112 may be a graphical user interface (GUI). In addition to comprising a computer program, user interface 112 may be connectively coupled to hardware components, such as those depicted in FIG. 4, for receiving user input. In the example embodiment, user interface 112 is implemented via a web browser, however in other embodiments user interface 112 may be implemented via a different program capable of receiving user interaction and communicating with other devices.

In the example embodiment, application 114 is a computer program, on mobile device 110, that is capable of receiving push notifications to be sent to the user's mobile device 110, which is registered with push notification service provider 120 and application backend server 130. In one embodiment, when application 114 is executed, application 114 transmits a request to application backend server 130 requesting any template updates. If there are any template updates, based on mobile device's 110 recognized token, the updated templates are transmitted to application 114 on mobile device 110, where the templates are stored locally on mobile device 110. In alternative embodiments, application 114 may receive updated templates upon request by the user, or at designated times/intervals.

In the exemplary embodiment, template database 116 receives and stores theme-based push notification templates associated with application 114 on mobile device 110 local storage. The theme-based push notification templates are received from application backend server 130, according to the type of mobile device 110. In an exemplary embodiment, received theme-based push notification templates are stored in template database 116 according to template ID (e.g. template1, template2, etc.), name (e.g. weatherTemplate, movieTemplate, offersTemplate, etc.) or any other identification system developed by the application software programmer. Updated theme-based push notification templates received from application backend server 130 may replace existing theme-based push notification templates stored locally in template database 116.

In the example embodiment, push notification service provider 120 includes token registration receiver/responder 122 and push notification sender 124, and may be a laptop computer, tablet computer, netbook computer, personal computer (PC), a desktop computer, a personal digital assistant (PDA), a smart phone, a server, or any programmable electronic device capable of communicating with mobile device 110 and application backend server 130 via network 102. Push notification service provider 120 may be implemented in a cloud computing environment, as described in relation to FIGS. 5 and 6, herein. Push notification service provider 120 may also have wireless connectivity capabilities allowing it to communicate with mobile device 110, application backend server 130, and other computers or servers over network 102. While push notification service provider 120 is shown as a single device, in other embodiments, push notification service provider 120 may be comprised of a cluster or plurality of computing devices, working together or working separately.

In the exemplary embodiment, push notification service provider 120 acts as the intermediary between application backend server 130 and mobile device 110. Push notifications are transmitted to push notification service provider 120 by application backend server 130, and in turn pushed to application 114 contained within mobile device 110. Different push notification service providers 120 exist based on different requirements of operating systems on various mobile devices 110.

Token registration receiver/responder 122, in an exemplary embodiment, is capable of receiving a registration request token from mobile device 110 and sending a registration response token to mobile device 110. Token registration receiver/responder 122 associates the registration request token with a particular application 114 of a particular mobile device 110, which in turn is used to identify, or associate, mobile device 110 when push notification service provider 120 pushes, or transmits, a push notification to application 114 on mobile device 110. Mobile device 110 transmits the registration response token, received from token registration receiver/responder 122, to application backend server 130, which is used to identify, or associate, a particular mobile device 110 containing application 114. The registration token, additionally, includes an application ID for the application 114 that is being registered. The application ID specifies the operating system of the mobile device 110, since various operating systems may contain different parameters and displays for received push notifications and associated templates.

The registration response token, transmitted to mobile device 110, is an ID issued by the push notification service provider 120 to application 114 on mobile device 110 that allows it to receive push notifications from application backend server 130. Essentially, the registration response token is associated with a particular application 114 on a particular mobile device 110.

Push notification sender 124, in the exemplary embodiment, is capable of receiving a push notification containing payload information, wherein payload information includes text, a template ID, and all parameters of the push notification template to be populated based on the push notification request from application backend server 130. In the exemplary embodiment, push notification sender 124 pushes, or transmits, the received push notification containing payload information to the registered mobile device 110 containing application 114. In exemplary embodiments, push notification sender 124 is capable of queueing received push notifications and transmitting them at designated days, times, or intervals. Alternatively, push notification sender 124 is capable of pushing, or transmitting, received push notifications to registered mobile device 110 as soon as they are received.

In the example embodiment, application backend server 130 contains push notification template program 132, registration database 138, and template database 139 and may be a laptop computer, tablet computer, netbook computer, personal computer (PC), a desktop computer, a personal digital assistant (PDA), a smart phone, or any programmable electronic device capable of communicating with mobile device 110 and push notification service provider 120 via network 102. In the exemplary embodiment, application backend server 130 is implemented in a cloud computing environment, as described in relation to FIGS. 5 and 6 herein, and may also have wireless connectivity capabilities allowing for communication with mobile device 110, push notification service provider 120, and other computers or servers over network 102. In other embodiments, application backend server 130 may include internal and external hardware components, as depicted and described in further detail below with reference to FIG. 4. While application backend server 130 is shown as a single device, in other embodiments, application backend server 120 may be comprised of a cluster or plurality of computing devices, working together or working separately.

With continued reference to FIG. 1, push notification template program 132, in the example embodiment, may be a computer application that contains instruction sets, executable by a processor. The instruction sets may be described using a set of functional modules, which include token registration receiver 134, template sender 135, and push notification generator 136. In alternative embodiments, push notification template program 132 may be a standalone program on a separate electronic device.

Token registration receiver 134 includes a set of programming instructions, in push notification template program 132, to receive a registration token from mobile device 110, and to store the received registration token received from mobile device 110. The received registration token from mobile device 110 contains a unique ID associating a particular application 114 with a particular mobile device 110. In the exemplary embodiment, token registration receiver 134 stores the received registration token in a database. As such, when an application is directed to send a push notification to all of its registered users, application backend server 130 uses the stored registration tokens in its database to identify which mobile devices 110 are going to receive the push notification.

Template sender 135 includes a set of programming instructions, in push notification template program 132, to send at least one theme-based push notification template to an associated application 114 on mobile device 110. The set of programming instructions is executable by a processor.

In exemplary embodiments, template sender 135 sends, or transmits, the at least one theme-based push notification template to the registered mobile device 110 containing the application 114, based on availability. If no theme-based push notification templates exist, then none will be sent. In various embodiments, updated, or refreshed, theme-based push notification templates are transmitted to the registered mobile device 110 on request, at application 114 startup, or at any other programmable interval/timeframe.

In the exemplary embodiment, the at least one theme-based push notification template is stored locally in template database 116 on mobile device 110. When a push notification is received by mobile device 110, via push notification service provider 120, a particular theme-based template may be identified within the payload information, and as such, used for displaying the push notification on mobile device 110.

Push notification generator 136 includes a set of programming instructions, in push notification template program 132, to generate a push notification containing payload information, based on receiving a push notification request from application 114 and associating the push notification request with an operating system of the mobile device 110, wherein the payload information comprises text, a template ID, and template parameters. Push notification generator 136 further transmits the push notification containing payload information to mobile device 110, via push notification service provider 120. The set of programming instructions is executable by a processor.

In an exemplary embodiment, push notification generator 136 is directed to send a push notification to either one, all, or select registered mobile devices 110 based on stored registration tokens identifying a particular application 114 with a particular mobile device 110. Application backend server 130 may serve different theme-based push notification templates based on the operating system of a particular mobile device 110. Different operating systems of different mobile devices 110 may have differently styled push notification templates available.

As such, push notification generator 136 generates payload information based on the requirements and capabilities of each operating system on a mobile device 110. For example, Android (Android is a registered trademark of Google, Inc.®) notification styles may include an avatar display, collapsed notification styles, actionable notifications, summarizing notifications, expanded views, feedback notifications, large icons, and progress display. iOS (iOS is a registered trademark of Apple, Inc.®) notification styles may include banners, alerts, badges, calendar views, actionable notifications, silent notifications, and sounds. Windows (Windows is a registered trademark of Microsoft, Corp.®) notification styles may include tiles, badges, and toast notifications.

In exemplary embodiments, various styled push notification templates may be based on sending offers to customers, movie updates, weather updates, etc. A push notification template sending offers to customers may contain, but is not limited to, a brand icon, and a URL to the offer website to be displayed to the user. A push notification template sending movie updates to a mobile device 110 may include, but is not limited to, a review of the interested movie, a video that contains the movie trailer (with watch later options available), a listing of local theatres playing the movie, and actionable items to buy tickets for a movie, which directs the user to a booking application. A push notification template sending weather updates to a mobile device 110 may include, but is not limited to, weather details text displayed in the locale of the user, along with an image to display the weather forecast (e.g. rain, snow, wind, sun).

In an exemplary embodiment, when a push notification is requested by application backend server 130 to be sent to the push notification service providers 120, the payload information is defined in a parameterized format in order to save the number of characters allowed in the push notification payload. The payload information may define the following: a template to be used for the push notification; and parameters in the order that they are populated into the template. Once the push notification, generated by push notification generator 136, reaches the application 114 running on mobile device 110, the application 114 understands the template to be used from the template ID (e.g. templateID8), as well as all of the parameterized values that are to be populated into the template contained within the payload information. The application 114 populates all of this payload information to display the theme-based push notification on mobile device 110.

In an exemplary embodiment, push notification generator 136 may generate and send the following offer payload information, provided by application 114, to a mobile device 110, via push notification service provider 120, for decoding and display to a user of a registered mobile device 110:

```
{
"message": {
    "alert": "3, James, Congratulations! You've HIT THE JACKPOT,
    }
}
```

An application 114 on mobile device 110 receives the above payload information and decodes it in accordance with the template ID, and parameterized values. As such, application 114 retrieves template #3, from template database 116 on mobile device 110, and populates the text of the push notification in accordance with locally stored template #3. The resulting theme based push notification may appear as follows: Hello James, Congratulations! You've HIT THE JACKPOT:-). The smiling face symbol may be an emoji or a graphical image, however the textual example used herein is for illustrative purposes only and is not to be seen as limiting.

In the exemplary embodiment, registration database 138 is located on application backend server 130 and may store received registration tokens from various registered mobile devices 110 that subscribe to a particular application 114. In the exemplary embodiment, registration database 138 receives the registration tokens from mobile device 110, via network 102.

In the example embodiment, template database 139 is located on application backend server 130 and stores the theme-based push notification templates available for various operating systems and mobile devices 110, according to template ID, name, or any other identification system. Depending on the stored registration tokens in registration database 138, which identify the operating system of a particular mobile device 110, template database 139 is capable of differentiating between which template format to be sent to which mobile device 110.

In the example embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between mobile device 110, push notification service provider 120, and application backend server 130.

Figure 2:
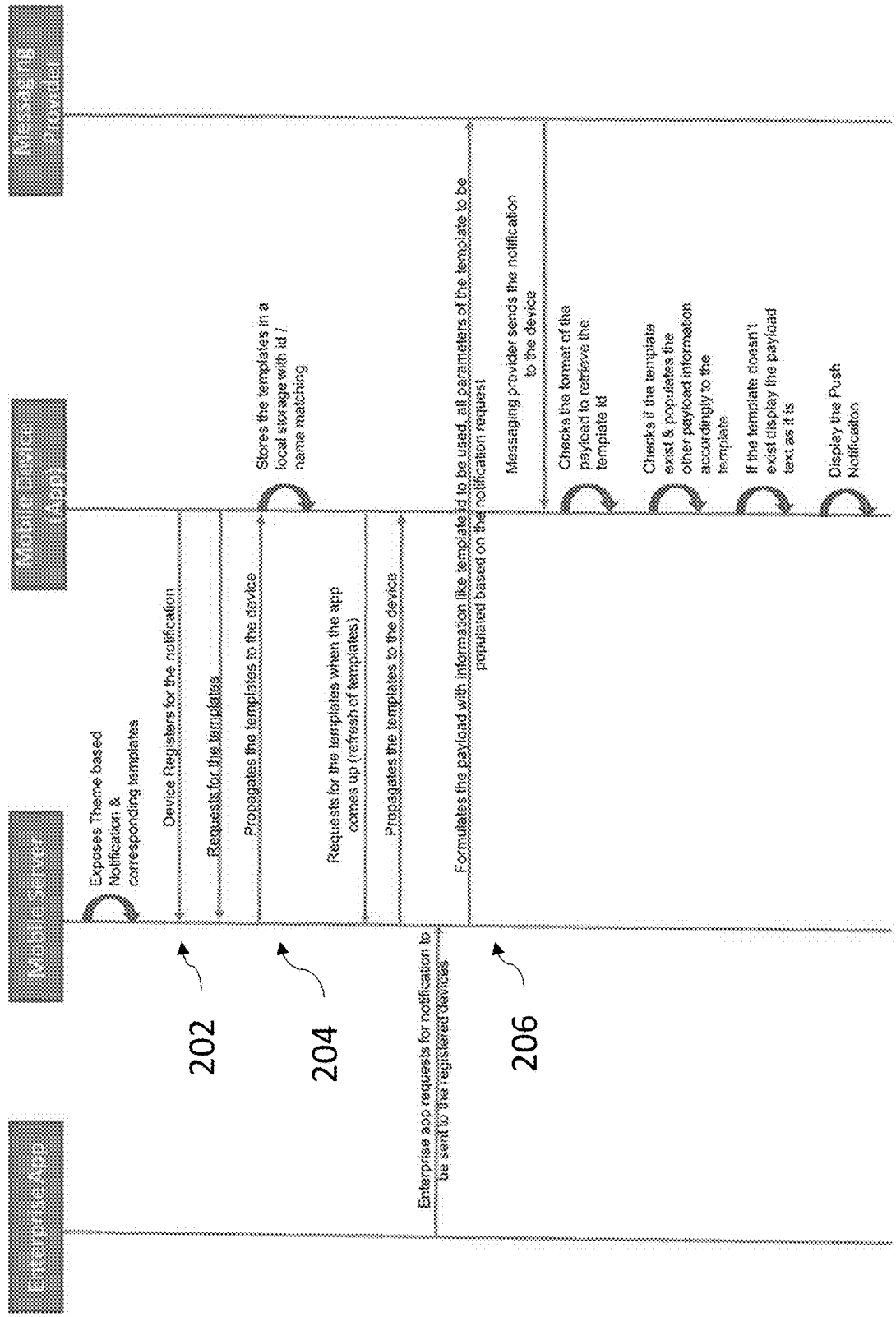
FIG. 2 is a flowchart illustrating the operation of push notification template program 132, in accordance with an embodiment of the present invention.
Figure 3:
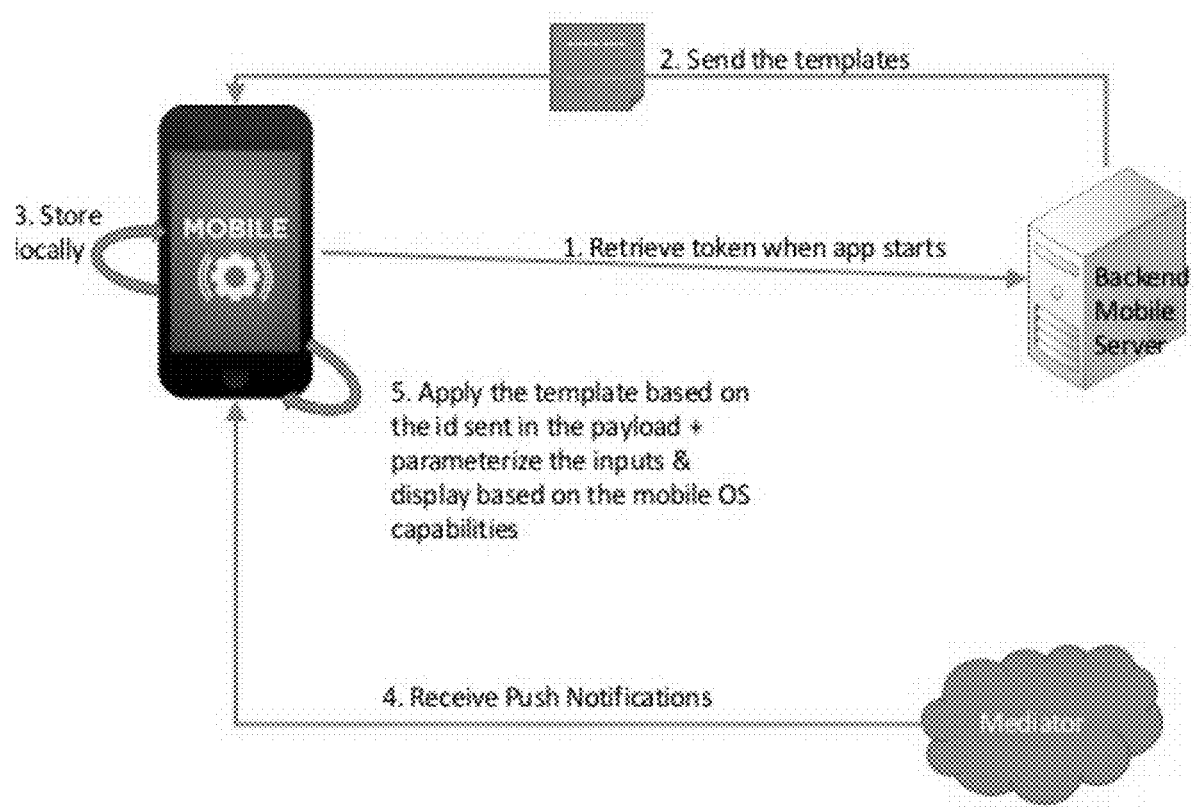
FIG. 3 illustrates the interaction between mobile device 110, application backend server 130, and push notification service provider 120, in accordance with embodiments of the present invention.

FIGS. 2-3 are flowcharts depicting operational steps of a method for implementing push notification template program 132, according to an embodiment of the present invention.

Referring now to FIGS. 1-3, push notification template program 132 receives a registration token from the mobile device 110 (step 202). In the exemplary embodiment, a mobile device 110, containing application 114, registers with application backend server 130 to receive push notifications. The registration of mobile device 110 with application backend server 130 is achieved by way of sending a registration token, by mobile device 110, to application backend server 130. The registration token associates the mobile device 110 containing the push notification based application 114 with the application backend server 130, thus allowing the mobile device 110 to receive application 114 specific push notifications.

With continued reference to FIGS. 1-3, push notification template program 132, via a processor, sends at least one theme-based push notification template to the mobile device 110, wherein the sending is based on registering the mobile device 110 using the registration token (step 204). In exemplary embodiments, the theme-based push notification templates are stored on application backend server 130. Upon receiving mobile device's 110 registration token, and request to opt-in to receiving push notifications, application backend server 130 transmits the theme-based push notification templates, according to mobile device's 110 operating system, to mobile device 110 where they are stored on template database 139 of mobile device 110 containing application 114. In other embodiments, when application 114 is started, the theme-based push notification templates, stored on template database 139 on application backend server 130, are synced with template database 116 on mobile device 110. Retrieving the theme-based push notification templates from application backend server 130 every time a push notification is received would be a performance degradation for application 114.

Referring now to FIGS. 1 and 2, push notification template program 132, via a processor, generates a push notification containing payload information, based on receiving a push notification request from application backend server 130, wherein the payload information comprises a template ID and template parameters (step 206).

In alternative embodiments, web push extensions are templates that are also applicable for web push notifications, and are stored in template database 116 of mobile device 110. Web push notifications also get styled based on templates stored on mobile device 110. Apart from instructing application 114 to display the push notification in a particular format, the stored templates also include support for various operating systems of a device.

With continued reference to FIGS. 1 and 2, push notification template program 132, via a processor registers the user device, participates in dissemination of at least one theme-based push notification template, and processes a push notification together with the at least one theme-based push notification template.

In an exemplary embodiment, registering the user's mobile device further includes sending, by a mobile device containing a push notification based application, a request registration token to a push notification service, receiving, by the mobile device containing the push notification based application, a response registration token from the push notification service, and transmitting, by the mobile device containing the push notification based application, the response registration token to a push notification based application server.

In an alternative embodiment, registering the user device may further include receiving, by the push notification based application server, a registration token from the mobile device, and storing, by the push notification based application server, the registration token received from the mobile device.

With continued reference to FIGS. 1 and 2, push notification template program 132, via a processor participates in dissemination of at least one theme-based push notification template by receiving, by a push notification based application on a mobile device, at least one theme-based push notification template from a push notification based application server, and storing, by the push notification based application on the mobile device, the at least one theme-based push notification template from the push notification based application server on a local storage of the mobile device.

In an exemplary embodiment, push notification template program 132, via a processor participates in dissemination of at least one theme-based push notification template by transmitting, by a push notification based application server, at least one theme-based push notification template to an associated push notification based application on the mobile device.

In an exemplary embodiment, processing a push notification based on the at least one theme-based push notification template, via push notification template program 132, may further include receiving payload information, by the push notification based application on the mobile device, from a push notification service provider, wherein the payload information comprises text, a template ID, and template parameters. Push notification template program 132 retrieves, by the push notification based application on the mobile device, the at least one theme-based push notification template corresponding to the template ID, populates, by the push notification based application on the mobile device, the at least one theme-based push notification template based on the payload information, and displays, by the push notification based application on the mobile device, the at least one theme-based push notification template containing populated payload information.

In an alternative embodiment, push notification template program 132 displays, by the push notification based application on the mobile device, the text of the payload information only, if a corresponding theme-based push notification template ID cannot be retrieved from the mobile device.

In an alternative embodiment, push notification template program 132 may processes a push notification based on the at least one theme-based push notification template by receiving, by a push notification based application server, a request, from the application, for a push notification containing text to be sent to the user device, associating, by the push notification based application server, the request with an operating system of the user device, generating, by the push notification based application server, payload information, and transmitting, by the push notification based application server, the payload information with the push notification containing text to a computing device. The payload information may include text, a template ID, and one or more template parameters. The computing device may include the user device, the push notification service, or both.

Figure 4:
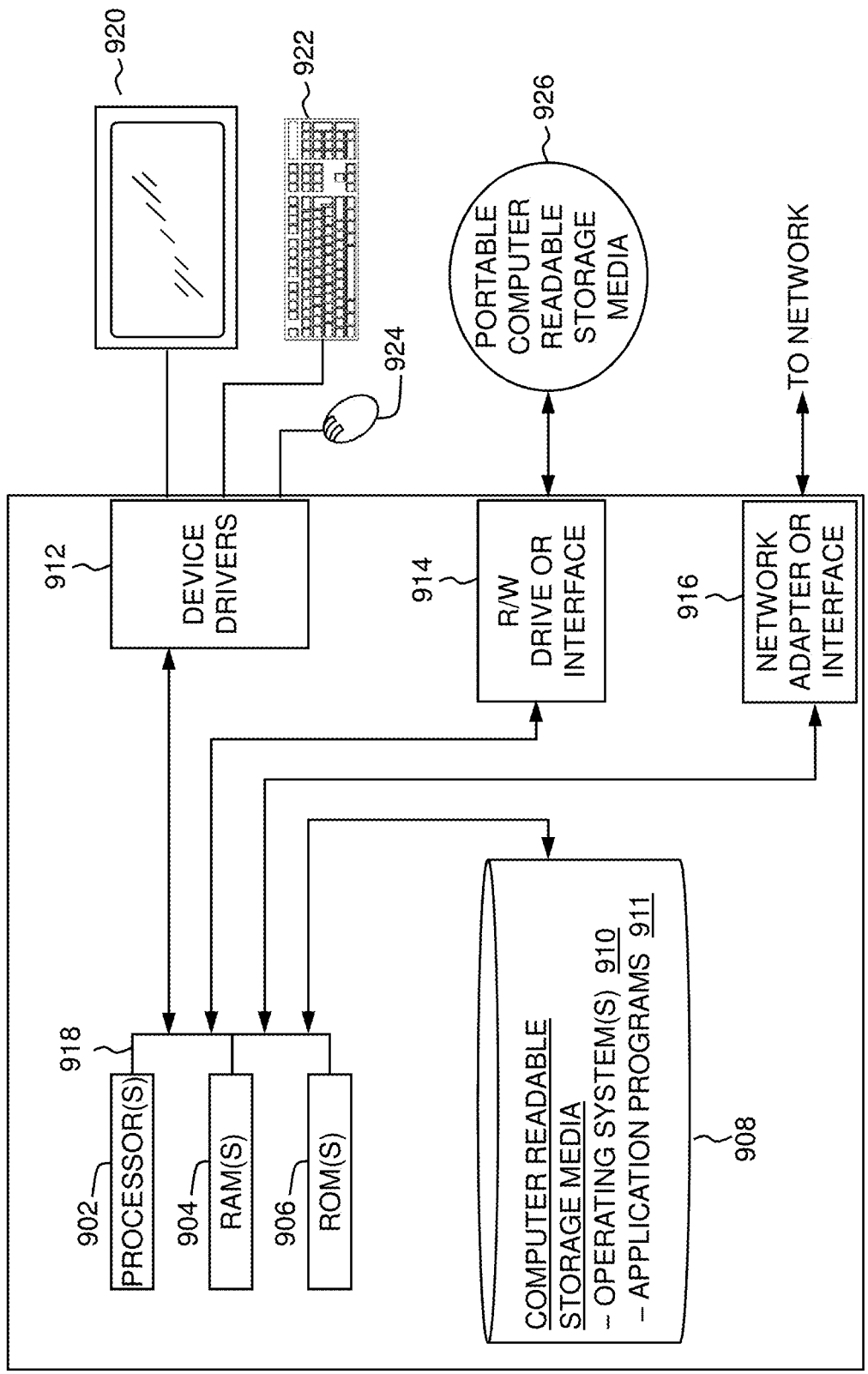
FIG. 4 is a diagram graphically illustrating the hardware components of push notification computing environment 100 of FIG. 1, in accordance with an embodiment of the present invention.

FIG. 4 is a diagram graphically illustrating the hardware components of push notification computing environment 100 (such as mobile device 110, push notification service provider 120, or application backend server 130, as shown in FIG. 1), in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Application backend server 120 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as push notification template program 132, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Application backend server 120 may also include a R/W drive or interface 914 to read from and write to one or more portable computer readable storage media 926. Application programs 911 on application backend server 120 may be stored on one or more of the portable computer readable storage media 926, read via the respective R/W drive or interface 914 and loaded into the respective computer readable storage media 908.

Application backend server 120 may also include a network adapter or interface 916, such as a TCP/IP adapter card or wireless communication adapter (such as a 4G wireless communication adapter using OFDMA technology). Application programs 911 on application backend server 120 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Application backend server 120 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
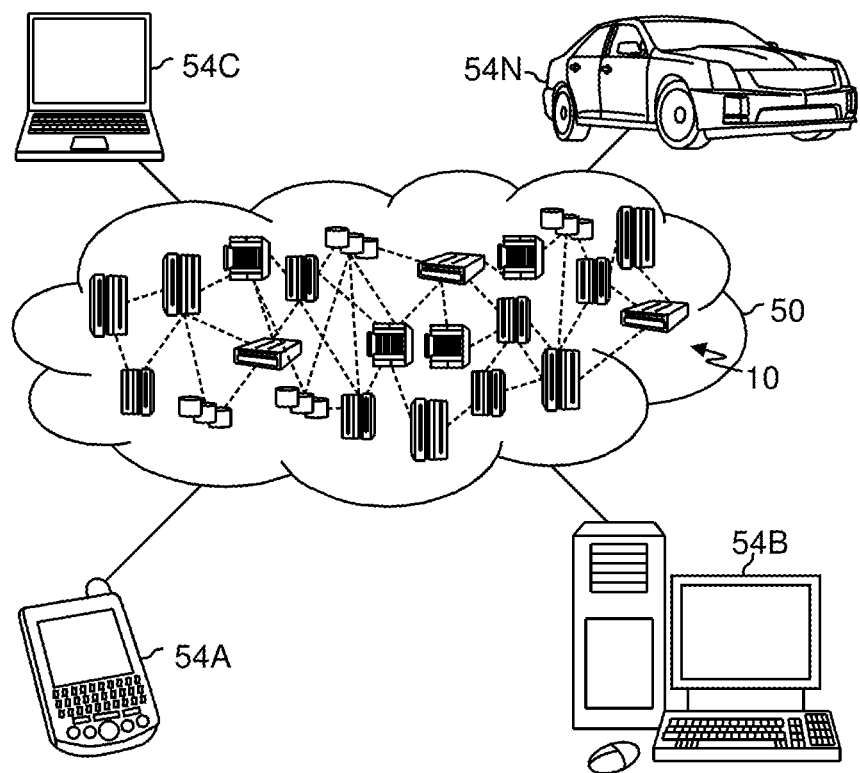
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
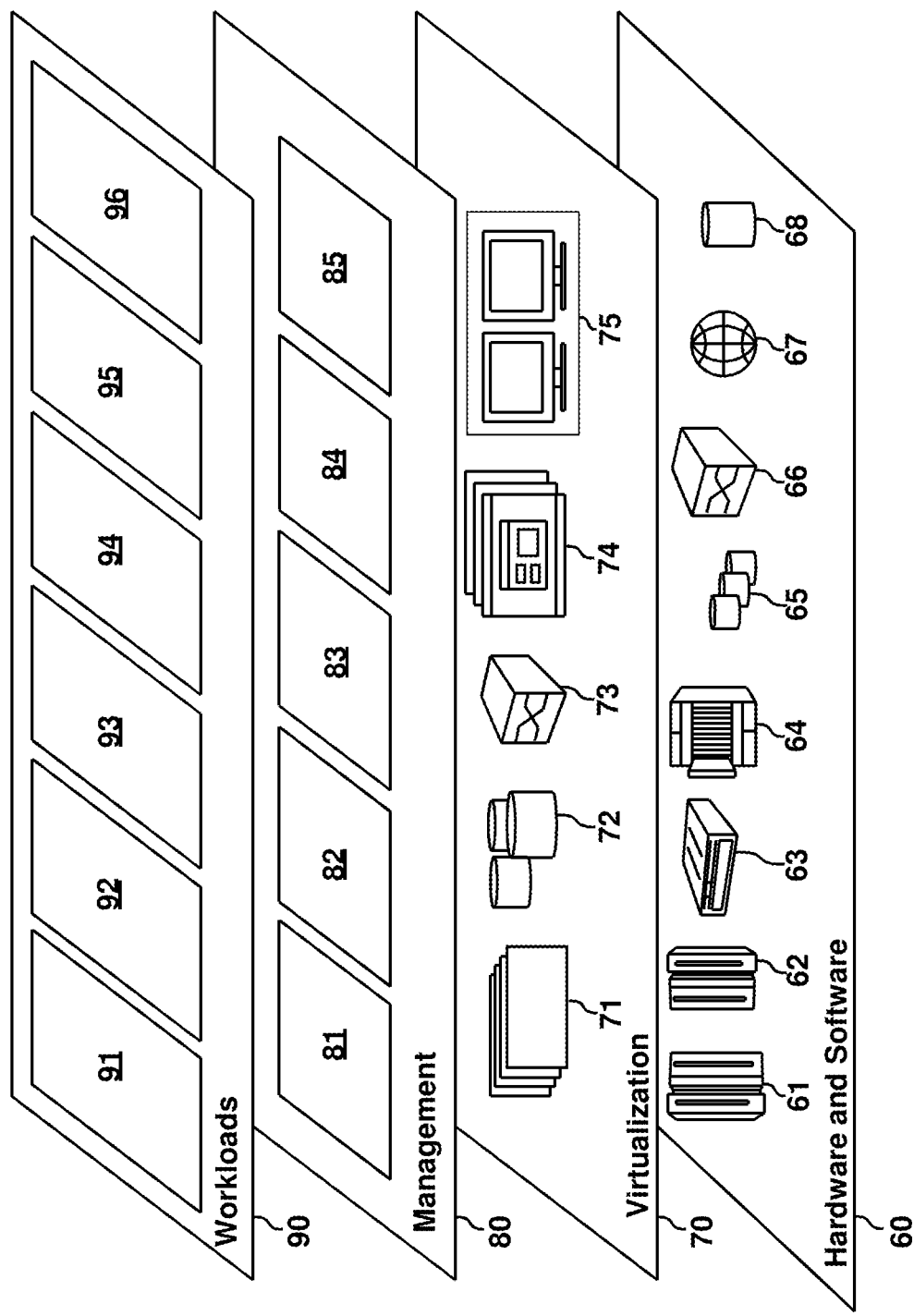
FIG. 6 depicts abstraction model layers of the illustrative cloud computing environment of FIG. 5, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and theme-based push notification processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer program product, comprising a non-transitory tangible storage device having program code embodied therewith, the program code executable by a processor of a computer to perform a method, the method comprising:
   registering a user device;
   identifying an operating system associated with the registered user device;
   receiving, by a push notification based application on the user device, at least one theme-based push notification template from a push notification based application server, wherein the push notification based application server defines the at least one theme-based push notification template based on the identified operating system associated with the registered user device;
   storing, by the push notification based application on the user device, the at least one theme-based push notification template from the push notification based application server on a local storage of the user device;
   upon running a push notification based application on the registered user device, syncing, automatically, one or more new theme-based push notification templates, from a push notification based application server, to the push notification based application;
   processing a push notification based on the at least one theme-based push notification template; and
   customizing payload information based on the requirements and capabilities of the operating system specific to the registered user device.

2. The computer program product of claim 1, wherein registering the user device further comprises:
sending, by the user device containing the push notification based application, a request registration token to a push notification service;
receiving, by the user device containing the push notification based application, a response registration token from the push notification service; and
transmitting, by the user device containing the push notification based application, the response registration token to the push notification based application server.

3. The computer program product of claim 1, wherein registering the user device further comprises:
receiving, by the push notification based application server, a registration token from the user device; and
storing, by the push notification based application server, the registration token received from the user device.

4. The computer program product of claim 1, further comprising:
transmitting, by the push notification based application server, the at least one theme-based push notification template to an associated push notification based application on the user device.

5. The computer program product of claim 1, wherein processing a push notification based on the at least one theme-based push notification template further comprises:
receiving payload information, by the push notification based application on the user device, from a push notification service provider, wherein the payload information comprises text, a template ID, and template parameters;
retrieving, by the push notification based application on the user device, the at least one theme-based push notification template corresponding to the template ID;
populating, by the push notification based application on the user device, the at least one theme-based push notification template based on the payload information; and
displaying, by the push notification based application on the user device, the at least one theme-based push notification template containing populated payload information.

6. A computer system, comprising:
one or more computer devices each having one or more processors and one or more tangible storage devices; and
a program embodied on at least one of the one or more storage devices, the program having a plurality of program instructions for execution by the one or more processors, the program instructions comprising instructions for:
registering a user device;
identifying an operating system associated with the registered user device;
receiving, by a push notification based application on the user device, at least one theme-based push notification template from a push notification based application server, wherein the push notification based application server defines the at least one theme-based push notification template based on the identified operating system associated with the registered user device;
storing, by the push notification based application on the user device, the at least one theme-based push notification template from the push notification based application server on a local storage of the user device;
upon running a push notification based application on the registered user device, syncing, automatically, one or more new theme-based push notification templates, from a push notification based application server, to the push notification based application;
processing a push notification based on the at least one theme-based push notification template; and
customizing payload information based on the requirements and capabilities of the operating system specific to the registered user device.

7. The computer system of claim 6, wherein registering the user device further comprises:
sending, by the user device containing the push notification based application, a request registration token to a push notification service;
receiving, by the user device containing the push notification based application, a response registration token from the push notification service; and
transmitting, by the user device containing the push notification based application, the response registration token to the push notification based application server.

8. The computer system of claim 6, wherein registering the user device further comprises:
receiving, by the push notification based application server, a registration token from the user device; and
storing, by the push notification based application server, the registration token received from the user device.

9. The computer system of claim 6, further comprising:
transmitting, by the push notification based application server, the at least one theme-based push notification template to an associated push notification based application on the user device.

10. The computer system of claim 6, wherein processing a push notification based on the at least one theme-based push notification template further comprises:
receiving payload information, by the push notification based application on the user device, from a push notification service provider, wherein the payload information comprises text, a template ID, and template parameters;
retrieving, by the push notification based application on the user device, the at least one theme-based push notification template corresponding to the template ID;
populating, by the push notification based application on the user device, the at least one theme-based push notification template based on the payload information; and
displaying, by the push notification based application on the user device, the at least one theme-based push notification template containing populated payload information.

11. The computer program product of claim 5, further comprising:
displaying, by the push notification based application on the user device, the text of the payload information only, if a corresponding theme-based push notification template ID cannot be retrieved from the user device.

12. The computer system of claim 10, further comprising:
displaying, by the push notification based application on the user device, the text of the payload information only, if a corresponding theme-based push notification template ID cannot be retrieved from the user device.

* * * * *